US012565942B2

(12) United States Patent
Fontana et al.

(10) Patent No.: US 12,565,942 B2
(45) Date of Patent: Mar. 3, 2026

(54) SYSTEMS HAVING HEATED VALVE MANIFOLD ASSEMBLIES, METHODS OF MANUFACTURE OF SAME

(71) Applicant: VERSUM MATERIALS US, LLC, Tempe, AZ (US)

(72) Inventors: Christopher David Fontana, Tempe, AZ (US); David Carl Eshelman, Tempe, AZ (US); Yusra Fatima, Tempe, AZ (US); Thomas William Piltz, Tempe, AZ (US); Mason Seidel, Tempe, AZ (US)

(73) Assignee: Versum Materials US, LLC, Tempe, AZ (US)

( * ) Notice: Subject to any disclaimer, the term of this patent is extended or adjusted under 35 U.S.C. 154(b) by 81 days.

(21) Appl. No.: 18/007,240

(22) PCT Filed: Sep. 28, 2020

(86) PCT No.: PCT/US2020/053069
§ 371 (c)(1),
(2) Date: Jan. 27, 2023

(87) PCT Pub. No.: WO2022/025950
PCT Pub. Date: Feb. 3, 2022

(65) Prior Publication Data
US 2023/0287992 A1     Sep. 14, 2023

Related U.S. Application Data

(60) Provisional application No. 63/057,872, filed on Jul. 28, 2020.

(51) Int. Cl.
*F16K 49/00* (2006.01)
*F16K 27/00* (2006.01)
*H05B 3/28* (2006.01)

(52) U.S. Cl.
CPC .......... *F16K 49/002* (2013.01); *F16K 27/003* (2013.01); *H05B 3/283* (2013.01); *Y10T 137/7036* (2015.04)

(58) Field of Classification Search
CPC ..... F16K 27/003; F16K 49/002; H01L 21/02; H01L 21/67017; Y10T 137/6851; Y10T 137/7036
(Continued)

(56) References Cited

U.S. PATENT DOCUMENTS

| | | | | |
|---|---|---|---|---|
| 3,858,632 A | * | 1/1975 | Stout | ..................... F16L 59/161 150/156 |
| 3,878,658 A | * | 4/1975 | Davis | ..................... B63B 25/16 220/592.25 |

(Continued)

FOREIGN PATENT DOCUMENTS

| | | |
|---|---|---|
| CN | 107367052 A | 11/2017 |
| EP | 0275677 A1 | 7/1988 |

(Continued)

OTHER PUBLICATIONS

"Extended European Search Report received for European Patent Application No. 20947601.9 mailing date Jun. 24, 2024", 10 Pages.
(Continued)

*Primary Examiner* — Kevin F Murphy
(74) *Attorney, Agent, or Firm* — Versum Materials US, LLC; Daniel A. DeMarah, Jr.

(57) ABSTRACT

A system for semiconductor fabrication having at least one heated valve manifold assembly comprising a heat-conductive plate having a total surface area, said conductive plate having a first side and a second side; at least one heater contacting said at least one heat-conductive plate; a valve manifold comprising a plurality of valves and pipes; said plurality of said valves and pipes having a total surface area
(Continued)

wherein a portion of the surface area of said plurality of valves and pipes contacts said at least one heat-conductive plate; and one or more layers of insulation covering: (i) a majority of the surface area of said plurality of said valves and pipes where said portion contacts said at least one heat-conductive plate, (ii) said at least one heater in contact with said at least one heat-conductive plate, and (iii) the majority of the surface area of said at least one heat-conductive plate.

21 Claims, 7 Drawing Sheets

(58) Field of Classification Search
    USPC .......................................... 220/592.2, 592.25
    See application file for complete search history.

(56) References Cited

U.S. PATENT DOCUMENTS

| | | | | |
|---|---|---|---|---|
| 4,562,857 | A * | 1/1986 | Ball | F16L 59/161 |
| | | | | 220/592.2 |
| 5,451,258 | A | 9/1995 | Hillman et al. | |
| 5,799,685 | A * | 9/1998 | Tezuka | G21F 5/08 |
| | | | | 137/382 |
| 6,060,691 | A | 5/2000 | Minami et al. | |
| 6,283,143 | B1 | 9/2001 | Adachi, Jr. | |
| 6,578,600 | B1 * | 6/2003 | Young, Jr. | H01L 21/67017 |
| | | | | 118/715 |
| 7,726,333 | B2 * | 6/2010 | Hoshi | F16K 49/002 |
| | | | | 137/341 |
| 7,775,508 | B2 * | 8/2010 | Choi | C23C 16/4481 |
| | | | | 261/142 |
| 9,469,976 | B1 * | 10/2016 | Banks | F24H 8/006 |
| 2007/0110415 | A1 | 5/2007 | Tanikawa et al. | |
| 2007/0169819 | A1 | 7/2007 | Shikata et al. | |
| 2009/0277510 | A1 * | 11/2009 | Shikata | F16K 27/003 |
| | | | | 137/334 |
| 2018/0080682 | A1 | 3/2018 | Mihu et al. | |
| 2018/0156373 | A1 | 6/2018 | Sasaki et al. | |
| 2020/0149162 | A1 | 5/2020 | Hidaka et al. | |

FOREIGN PATENT DOCUMENTS

| | | | |
|---|---|---|---|
| EP | 1048884 | A2 | 11/2000 |
| JP | 2016-191140 | A | 11/2016 |
| KR | 10-0775791 | B1 | 11/2007 |
| KR | 20130068059 | A | 6/2013 |
| KR | 10-1285562 | B1 | 7/2013 |
| KR | 10-2019-0129887 | A | 11/2019 |
| TW | 414841 | B | 12/2000 |
| TW | 200504799 | A | 2/2005 |
| TW | 200528654 | A | 9/2005 |
| TW | 201707504 | A | 2/2017 |
| TW | 201920761 | A | 6/2019 |
| WO | 95/31583 | A1 | 11/1995 |
| WO | 2017002241 | A1 | 1/2017 |
| WO | 2018179999 | A1 | 10/2018 |
| WO | 2022/025950 | A1 | 2/2022 |

OTHER PUBLICATIONS

"International Preliminary Report on Patentability received for PCT Application No. PCT/US2020/053069, mailing date Feb. 9, 2023", 7 Pages.

"International Search Report and Written Opinion received for PCT Application No. PCT/US2020/053069, mailing date Apr. 27, 2021", 9 Pages.

* cited by examiner

100

97

98

22

14

20

12

16

89

81

82

82

81

420

20

410

75

12   33

14

78

400

77

79

41

78

76

81

82

82

81

22

SYSTEMS HAVING HEATED VALVE MANIFOLD ASSEMBLIES, METHODS OF MANUFACTURE OF SAME

CROSS-REFERENCE TO RELATED APPLICATIONS

This application is a National Stage filing under 35 U.S.C. 371 of International Patent Application No. PCT/US2020/053069 filed Sep. 28, 2020, which claims priority to the U.S. provisional application 63/057,872 filed on Jul. 28, 2020, the entire contents of these applications are incorporated herein by reference in their entirety.

BACKGROUND OF THE INVENTION

The present invention relates to heated valve manifold assemblies, systems having the same and methods of assembling and methods of repairing the same.

It is often necessary to distribute chemical to a series of points of use located within an industrial facility. For instance, in a semiconductor manufacturing facility, liquid chemicals such as photo-resist, slurries, hydrofluoric acid, hydrogen peroxide, ammonium hydroxide, and etc., are distributed to various tools used in the manufacture of the semiconductors. Similarly, gas-phase chemicals such as hydrogen fluoride, nitrogen trifluoride, and anhydrous ammonia also may require distribution in this manner. Typically, a source unit, that can be one or more pumps, chemical vessels, or pressure vessels, induces fluid flow through a fluid circuit having a series of valve manifolds that are used to connect groups of tools to the fluid circuit. The fluid circuit is often provided with valve boxes to enclose the valve manifolds. As a result, any leakage from either the piping or the valve manifolds is deposited into the valve manifold boxes (VMB) which thereby serve to contain the leakage. These boxes may utilize ventilation to provide a means of abatement and protection from hazardous vapor-phase process materials. Alternatively, there may be no box at all involved if there are no hazardous materials present. In this case, the overall assembly may be referred to as a valve manifold panel, or VMP.

Manifolds are also provided within gas or chemical delivery cabinets. Gas delivery cabinets typically supply gases from a gas-filled supply container to one or more tools in a semiconductor fabrication facility. Chemical delivery cabinets supply fluids to one or more tools in a semiconductor fabrication facility. The fluids may be gases or liquids when supplied to the tool typically from a supply container having solids, liquids or gases therein. Gas and chemical delivery cabinets may be very complicated to allow for the supply of push gases or purge gases and/or solvent cleaning or gas supplies to pneumatic actuators, etc.

Sometimes it is necessary or beneficial to heat the valves and the pipes that are used in the valve manifold, such as, in the valve manifold box, in the gas delivery cabinet or in the chemical delivery cabinet, to improve the flow of the fluid(s) therein, especially if the fluid is viscous at lower temperatures and/or if room temperature is at or near the temperature that the fluid changes to (or from) the desired delivery phase of matter.

Typically, heat is provided to the valves and piping that make up the manifold by using heat trace, an electrical resistive heating wire, that is wrapped around each valve and pipe for the purposes of providing heat to them. Over the wire, one or more layers of insulative tape is typically wrapped to prevent the heat from dissipating to the ambient environment. FIG. 1 shows the heat trace in use around pipes in a prior art gas or chemical delivery cabinet. If a repair needs to be made to a valve or pipe, the heat trace must be unwrapped and removed. Although heat trace is effective and reliable if not disturbed, upon removing it, the wire is often broken, and must be replaced. The heat trace and the insulation layer installed thereover require much labor and time to: install during the original manufacture; uninstall for repairs and reinstall after performing a repair. There is great pressure to maximize the uptime of all of the tools in a fab, including the systems that supply them with the necessary gases and chemicals for manufacture; therefore, there is pressure to increase the uptime of all systems having manifolds that supply gas and chemicals to the tools. Additionally, there is also pressure to decrease the footprint for manifolds and delivery systems with manifolds therein, causing increasing numbers of valves and pipes in a given space which for gas delivery cabinets and chemical delivery cabinets also include an increase in the size or number of supply to containers in those cabinets. Additionally, there is a need to speed up the manufacture of these manifolds. The present invention addresses these issues.

BRIEF SUMMARY OF THE INVENTION

In one aspect, this invention provides a system to dispense fluid to one or more tools for semiconductor fabrication having at least one heated valve manifold assembly comprising a heat-conductive plate having a total surface area, said conductive plate having a first side and a second side; at least one heater contacting said at least one heat-conductive plate; a valve manifold comprising a plurality of valves and pipes; said plurality of said valves and pipes having a total surface area wherein a portion of the total surface area of said plurality of valves and pipes contacts said at least one heat-conductive plate; and one or more layers of a thermal insulative material covering: (i) a majority of the surface area of said plurality of said valves and pipes wherein said portion is in contact with said at least one heat-conductive plate, (ii) said at least one heater in contact with said at least one heat-conductive plate, and (iii) the majority of the surface area of said at least one heat-conductive plate.

In the system, the one or more layers of insulation may comprise insulation board and/or insulation attached to a plastic cover; and/or an insulated jacket made of flexible insulating material and/or is custom-fabricated to form-fit over the plurality of said valves and piping and/or is shaped to provide a heated air volume towards the center of the heat conductive plate where most of the plurality of pipes and valves are mounted on the heat-conductive plate. The one or more layers of insulation in any embodiment described herein may be removably attached to said conductive plate using fasteners, selected from bolts, screws, clamps, cable ties, magnets, or adhesives, zippers, snaps, clasps, bungee cords, hook and eye, or hook and loop strips (such as Velcro®) or the like.

In another aspect of the invention, alone or in addition to any of the aspects, a portion of said plurality of the valves and pipes contacts said first side of said at least one heat-conductive plate; and said at least one heater contacts said second side of said at least one heat-conductive plate. In an additional aspect, alone or in addition to any of the other aspects, the plurality of said valves and pipes contacts said first side of said at least one heat-conductive plate and said one or more heaters contact said first side of said at least one heat-conductive plates. In an additional aspect, alone or in addition to any of the other aspects, the plurality of said valves and pipes contacts said first and/or second side of said at least one heat-conductive plate and said one or more heaters contact said first and/or second side of said at least one heat-conductive plates. In any system the pipes and valves may be attached to said heat-conductive plate and/or the one or more heaters may be attached to said heat-conductive plate. In another aspect, alone or in addition to any of the other aspects, the assembly comprises a first insulation board attached to or covering a first side of the heat-conductive plate and a second insulation board attached to or covering a second side of the heat-conductive plate. In another aspect, alone or in addition to any of the other aspects, said pipes attached to said heat-conductive plate have quick release connectors that can be disconnected and reconnected for the rapid removal and replacement of the heated valve manifold assembly. In another aspect, alone or in addition to any of the other aspects, the system of any of the preceding claims further comprise a cabinet and at least one container of said fluid, wherein said cabinet houses said heated valve manifold assembly and said at least one container. In another aspect, alone or in addition to any of the other aspects, the system of any of the preceding claims further comprise a cabinet wherein said cabinet houses said heated valve manifold assembly.

In another aspect, alone or in addition to any of the other aspects the heated valve manifold assembly is mounted on a wall or panel using spacers to prevent contact between the heated valve manifold assembly and the wall or panel. Any of the systems comprising a heated valve manifold assembly may further comprise a backup heater, and/or one or more temperature sensors and/or one or more controllers and/or a controller for said one or more heaters. Any of the systems may be a gas or chemical delivery cabinet, or a valve manifold box or a valve manifold panel. Additionally, any of the heated valve manifold assemblies of any of the systems may have one or more layers of insulation that are removably attached to said conductive plate using fasteners that are substantially free of or free of adhesives. In another aspect, this invention further provides a method of manufacturing the system of this invention comprising the steps of contacting and/or attaching the pipes and valves of the valve manifold to the heat-conductive plate; contacting and/or attaching one or more heaters to the heat-conductive plate; covering and/or attaching one or more layers of insulation over the one or more heaters, and a majority of the surface area of the pipes and valves heated by or contacting the heat-conductive plate and/or the majority of the surface area of the heat-conductive plate to form a heated valve manifold assembly. In another aspect, the method further comprises the step of joining the pipes and valves of the valve manifold to create fluid tight seals within the valve manifold. In another aspect of the method of manufacturing, alone or with other aspects includes the step of attaching the one or more layers of insulation with mechanical fasteners. In any method, the step of attaching the one or more layers of insulation may be substantially free of or free of adhesives. In another aspect, alone or with other aspects, is the method of repairing the system comprising the steps of removing said one or more insulation layers to access said valve manifold; repairing a faulty valve, pipe or other component; and re-attaching said one or more insulation layers. In another aspect of method of repairing, the removing step is preceded by a step of removing one or more mechanical fasteners and said re-attaching step includes the step of re-attaching said one or more mechanical fasteners. In another aspect of the invention, the method of repairing the system may comprise the steps of removing the heated valve manifold assembly as a single unit from the system and replacing it with a new already-assembled heated valve manifold assembly. In another aspect in the method of repairing, the removing step may be preceded by a step of removing one or more mechanical fasteners and opening some quick release connectors; and said replacing step includes the steps of re-attaching said one or more mechanical fasteners and closing some quick release connectors.

This invention provides for faster manufacturing and repairs of heated valve manifold assemblies and the systems using them. With the removal of a few fasteners, typically mechanical fasteners, such as nuts, bolts, screws and/or others, and one or more layers of thermal insulation, a faulty valve for example, or other faultycomponent, is easily accessed, repaired and then the one or more layers of thermal insulation are reinstalled using the one or more fasteners and the heated valve manifold assembly is ready for reuse after the necessary purge steps, if any. The method of repairing the heated valve manifold assemblies would preferably be preceded by closing any valves to a process gas supply, and if necessary due to the nature of the process gas, purging and/or venting the heated valve manifold assembly and/or the gas cabinet or valve manifold box or valve manifold panel, prior to removing any fasteners and/or insulation layers. The heated valve manifold assemblies of this invention can be manufactured and repaired without the labor-intensive step of wrapping each pipe and valve multiple times with the heat trace wire and layers of thermal insulation thereover. The use of the heated valve manifold assemblies of this invention speeds up the manufacture and repair of the systems. If a pipe or valve or other component of the heated valve manifold assembly is not working, the entire heated valve manifold assembly can be removed after unscrewing several pipe connections, unplugging any electrical connections, and removing any mounting fasteners, if any, and then replaced with an entirely new heated valve manifold assembly. The unworking heated valve manifold assembly that was removed can then be returned to the factory for refurbishment, quality analysis and testing, if any, and later possible reuse. This invention allows for the maximization of the uptime of all of the tools in a fab supplied with the necessary gases and chemicals for manufacture from systems having a heated valve manifold assembly therein, and increased uptime of the systems of this invention having a heated valve manifold assembly therein. The heated valve manifold assembly of this invention may also maximize the space for the pipes and valves in a manifold by eliminating the space necessary for layers of thermal insulation around each valve and pipe; thereby allowing for increasing the numbers of valves and pipes and supply containers in the same footprint or cabinet. These and other benefits are provided by this invention.

BRIEF DESCRIPTION OF SEVERAL VIEWS OF THE DRAWINGS

While the specification concludes with claims distinctly pointing out the subject matter that applicants regard as their invention, it is believed that the invention will be further understood when taken in connection with the accompanying drawings in which:

DETAILED DESCRIPTION OF THE INVENTION

The systems of this invention include VMB and VMP, gas and chemical delivery systems or any system that delivers a fluid to one or more tools in a fab. The description of one type system is not meant to be limiting. Additionally, insulation when used herein means thermal insulation, which may also include heat reflective materials, if desired.

Figure 1:
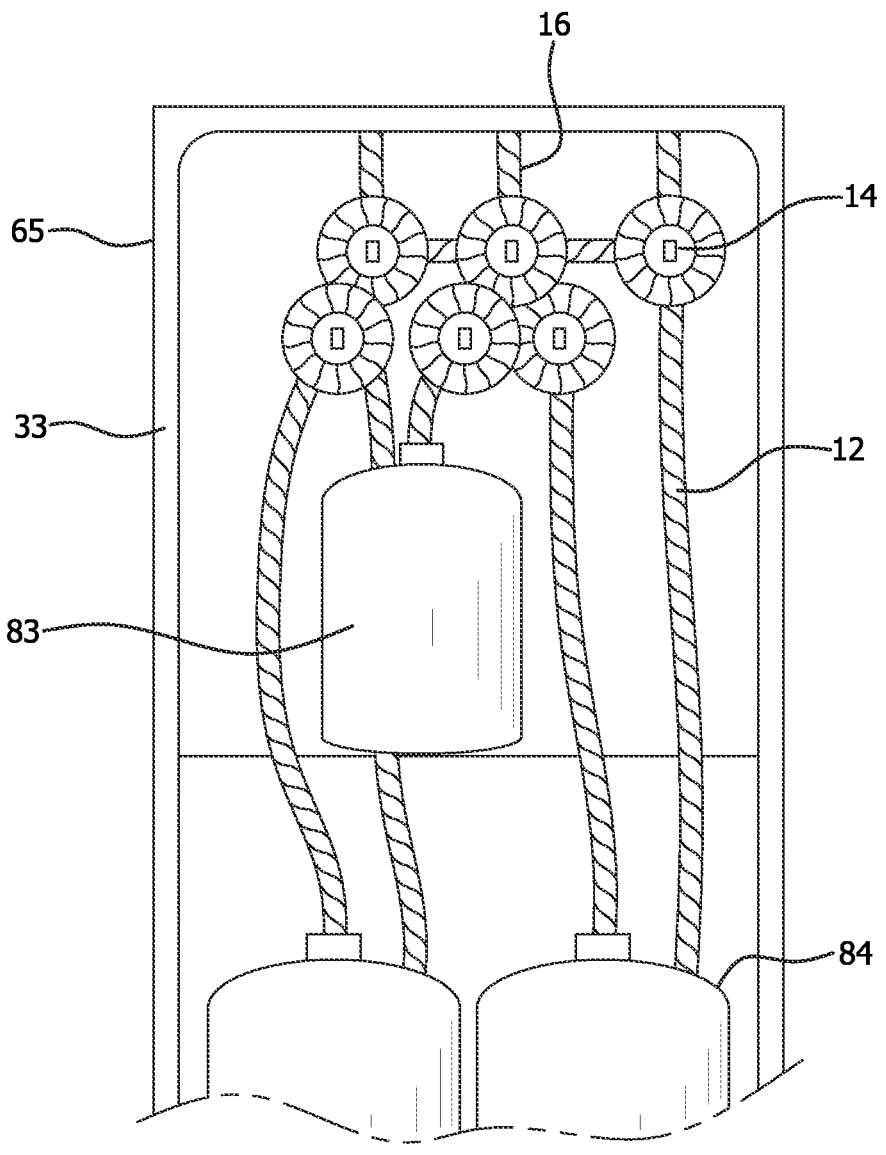
FIG. 1 is a partial front view of the interior of a prior art system showing the pipes and valves wrapped in heat trace and thermal insulation.

FIG. 1 shows the plurality of pipes 12 and valves 14 in a prior art system with each pipe and valve having the heat trace (not shown) with the taped insulation 16 thereon. As shown, the system may be a gas or chemical supply cabinet having as shown, housing 65, supply container 83 and refill containers 84. As discussed, although effective, installing, uninstalling and reinstalling the taped insulation and heat trace is time consuming and bulky. The heat trace and layers of insulation take up space and require empty space around the pipes and valves for a repair person's hands to install and/or repair the same.

Figure 2:
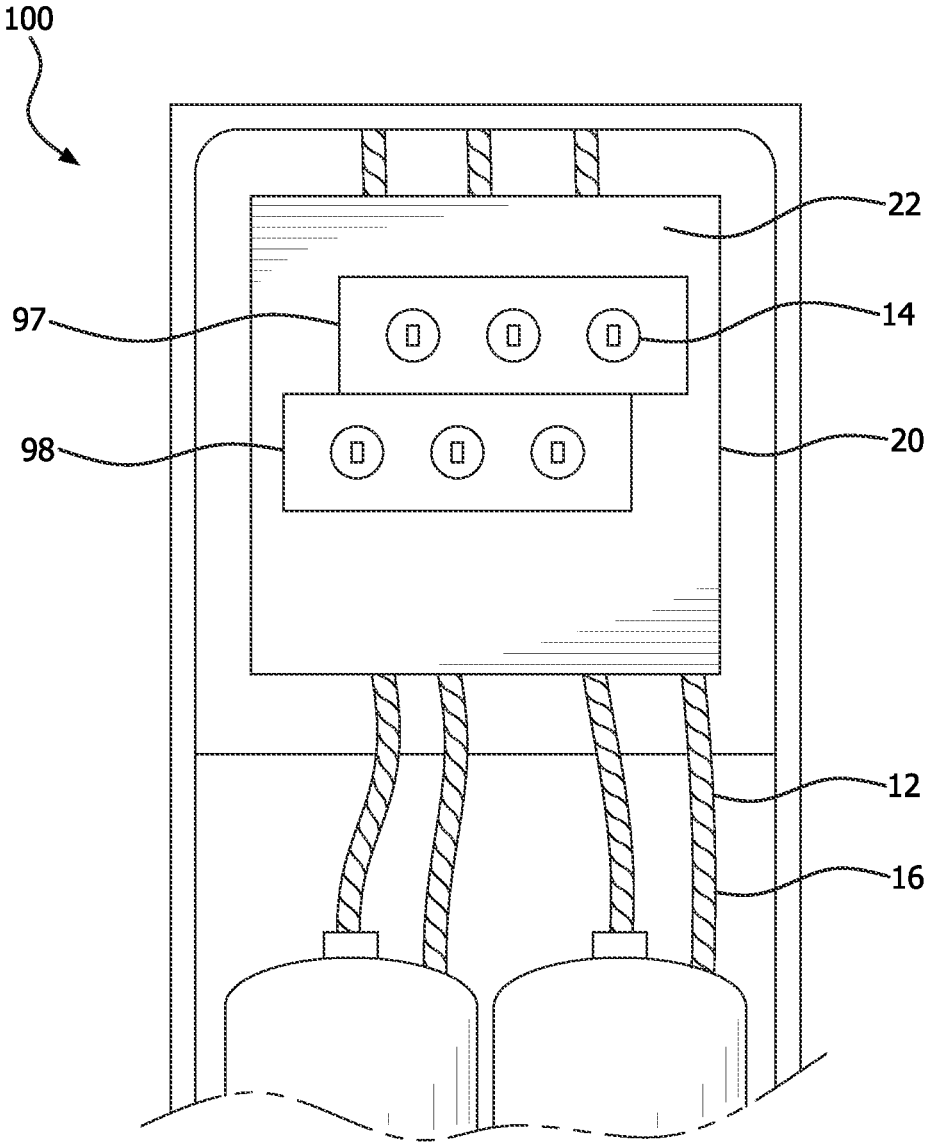
FIG. 2 is a partial front view of the interior of a system of this invention showing one embodiment of the heated valve manifold assembly therein.
Figure 3:
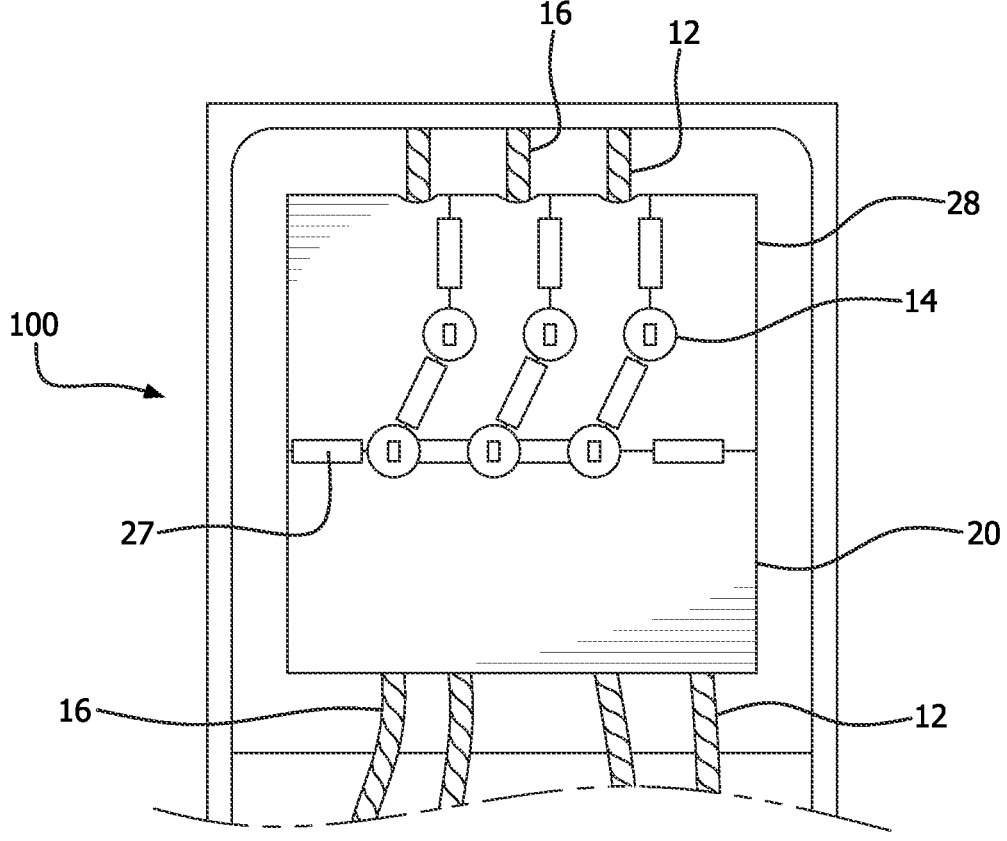
FIG. 3 is a partial front view of the interior of a system of this invention showing a second embodiment of the heated valve manifold assembly.

FIG. 2 and FIG. 3 show portions of the same or similar system 100, e.g. gas or chemical delivery system as shown in FIG. 1, with the similar numbers of pipes 12 and valves 14 but using various embodiments of the heated valve manifold assembly 20 of this invention. The pipes that lead to and from the manifold assembly 20 in the system may be heated and insulated using the heat trace (not shown) and the taped insulation 16 thereon, but the areas of the pipes and the valves of which at least a small portion of the areas of those pipes and valves contact the heat-conductive plate of the heated valve manifold assembly used in the systems of this invention would be heated by the heat-conductive plate of this invention and would thereby avoid the need to have the heat trace and wrapped insulation tape installed thereon. The pipes and valves are at least substantially if not totally made of metal and therefore, by heating the pipes and valves in contact with the heat-conductive plate, the fluids, gases or chemicals within those pipes and valves would thereby also be heated. Preferably, as stated earlier, at least a majority or more of the pipes and valves of the valve manifold assembly contact the heat-conductive plate. For a majority of or the balance of the surface areas of the pipes and the valves that are part of the valve manifold assembly but for which at least a portion of the surface thereof does not contact the heat-conductive plate of the heated valve manifold assembly, preferably at least some portion the surface area of those pipes and valves are preferably in close proximity to the heat-conductive plate. Close proximity is relative to the size of the piping in the system, but is preferably less than the distance, equal to the diameter of the largest diameter pipe connected to the heat-conductive plate, away from the heat-conductive plate. Alternatively, for some embodiments, close proximity preferably means that at least the closest part of the pipe or valve of the valve manifold assembly is less than 10, or 5, or 4, or 2, or 1 centimeter(s) away from the surface of the heat-conductive plate, if no portion of it is contacting the heat-conductive plate.

As shown in FIG. 2 is an outside layer of insulation 22 that is part of the heated valve manifold assembly 20 of this invention. The outside layer of the insulation 22 may comprise one of more pieces of insulation board or foam. The insulation may be rigid sheets, such as rigid foam or board, that are cut to cover at least the majority of the heat-conductive plate (not shown), the heater (not shown) and the valve manifold comprising the pipes and valves in contact with the heat-conductive plate. The insulation would also be cut or formed to allow the passage therethrough of the valves and pipes to make the necessary manifold connections to fluid supply pipes that enter (chemical supply lines, purge gas, pneumatic gas lines or tubes or pipes) or leave the manifold (fluid supplied to the tools, vent lines) as is known to a person of ordinary skill in the art. Alternatively or additionally, the insulation board or foam may be formed or cut to form-fit at least some of the pipes or valves or other components that are part of the heated valve manifold assembly. For valves and pipes that are not in contact or have portions that project away for the plate, or are in close proximity (are offset) to the heat-conductive plate, additional layers of insulation may be added on top of one or more layers of insulation, with at least a portion of the bottommost layer of insulation covering and/or contacting at least a portion of the heat-conductive plate and/or the valves or the pipes contacting the heat-conductive plate. The insulation may be fabric, board or foam and may be made of polystyrene foam, urethane foam, fiberglass, ceramic wool, cellulose, cork, silicone rubber, perlite, vermiculite or others known to the art. In FIG. 2 additional (outside) layers of insulation, shown as 97 and 98, are formed to fit over the valves that project away from or are offset (or are in close proximity) from the heat-conductive plate. The insulation layers 97 and 98 are generally rectangular in shape and can be form-fitted to the valves and/or held by hook and loop strips, attached to the insulation layer beneath, or the like. Note the term layer to describe the insulation, is not meant to be limiting, and includes pieces or portions however applied or attached to the valve manifold assemblies of this invention.

In alternative embodiments, such as is shown in FIG. 3, the one or more layers of insulation that are part of the heated valve manifold assembly 20, or at least the outside layer, may take the form of a thermal jacket 28 wrapped around and/or covering at least a portion of the valve manifold and one or more heat-conductive plates and one or more heaters. As shown in FIG. 3, the thermal jacket is custom-made to fit around the manifold, one or more heat-conductive plates and one or more heaters leaving openings for the valves and pipes where necessary. The thermal jacket is held in place using any fasteners, including the ones listed above and others, such as, zippers, snaps, clasps, bungee cords, hook and eye, or hook and loop strips (such as Velcro®) 27 or the like. In yet other embodiments, other insulation materials, such as insulating fabrics may be used. In still other embodiments, a mix of several materials or several different layers of materials may be used. For example, portions of the manifold, such as the back side of the manifold assembly may comprise (may be covered with) a rigid insulation board and the front side may be covered with a thermal jacket. (The front side of the heated valve manifold assembly is shown in FIGS. 2 and 3). Alternatively and additionally, portions or the entire heated valve manifold may be covered with a fitted plastic cover (not shown) to protect the insulation layers underneath the cover. The plastic cover and other layer or layers of insulation beneath would be provided with the necessary openings to allow for the piping and electrical connections to the pipes and the valves of the heated valve manifold assembly. The plastic cover may have the insulation attached thereto.

The insulation is preferably sized to cover a majority, or greater than 75%, or greater than 90%, or greater than 99% of the exterior (surface area) of one or more heat-conductive plates and a majority of the exterior (surface area) of all of the pipes and valves in contact with the one or more heat-conductive plates and the exterior of one or more heaters that are contacting or attached to the one or more heat-conductive plates, (meaning the portion of the one or more heaters that are not in contact with the heat-conductive plates). In more preferred embodiments, the insulation is preferably sized to cover a majority, or greater than 75%, or greater than 90%, or greater than 99% of the surface area of one or more heat-conductive plates and a majority, or greater than 75%, or greater than 90%, or greater than 99% of the surface area of all of the pipes and valves in contact with the heat-conductive plate, and a majority, or greater than 75%, or greater than 90%, or greater than 99% the exterior surface area one or more heaters that are contacting or attached to the one or more heat-conductive plates. The portions of the heated valve manifold assembly that are not covered by the one or more layers of insulation are minimized to prevent the loss of heat to the atmosphere or the rest of the system. In some embodiments, the entire heated valve manifold assembly is covered with thermal insulation. The insulation layers may cover the heat-conductive plate or the pipes or valves attached thereto, but may or may not contact the entire surface of the heat-conductive plate that is not in contact with the one or more heaters and the plurality of pipes and valves. Further, the valves may be left uncovered by the insulation where connections to other valves and pipes must be made, although preferably the uncovered portions of the valves are minimized. Covered by insulation does not necessarily mean contacted by the insulation, although in some embodiments covered may mean both covered and contacted by the insulation.

In some embodiments the insulation may be built up around the edges of the heat-conductive plate, for example, by using strips of insulation board, for example, like a picture frame or a portion of a picture frame, such as, two vertical strips and one or two horizontal strips (where possible) across the top and/or bottom of the heat-conductive plate, and then a second larger layer of insulation board may be attached on top of the picture frame. By applying the layers of insulation in this way, a heated volume 64 (defined by the surface of the heat-conductive plate on one side, the vertical and/or horizontal strips of insulation preferably located around the outside edges of the heat-conductive plate, and the underside of the layer of insulation attached to the vertical and/or horizontal strips of insulation) is created which holds the heat in the heated volume and allows for the heat to be more evenly provided to the pipes and valves located in contact with the heat-conductive plate within the heated volume. The heated volume is typically a heated air-filled or inert-gas-filled space.

The one or more layers of insulation may be held onto the heat-conductive plate by any attachment mechanisms, such as, one or more selected from screws, nuts and bolts, Velcro, straps, clamps, zippers, cable ties, magnets, or adhesives. In the preferred embodiment the insulation board and strips of insulation board are held in place by partially threaded bolts that pass through holes in the heat-conductive plate with washers and mating threaded nuts. In some embodiments, the removable fasteners or attachment mechanism for the insulation is free of adhesives.

Figure 4:
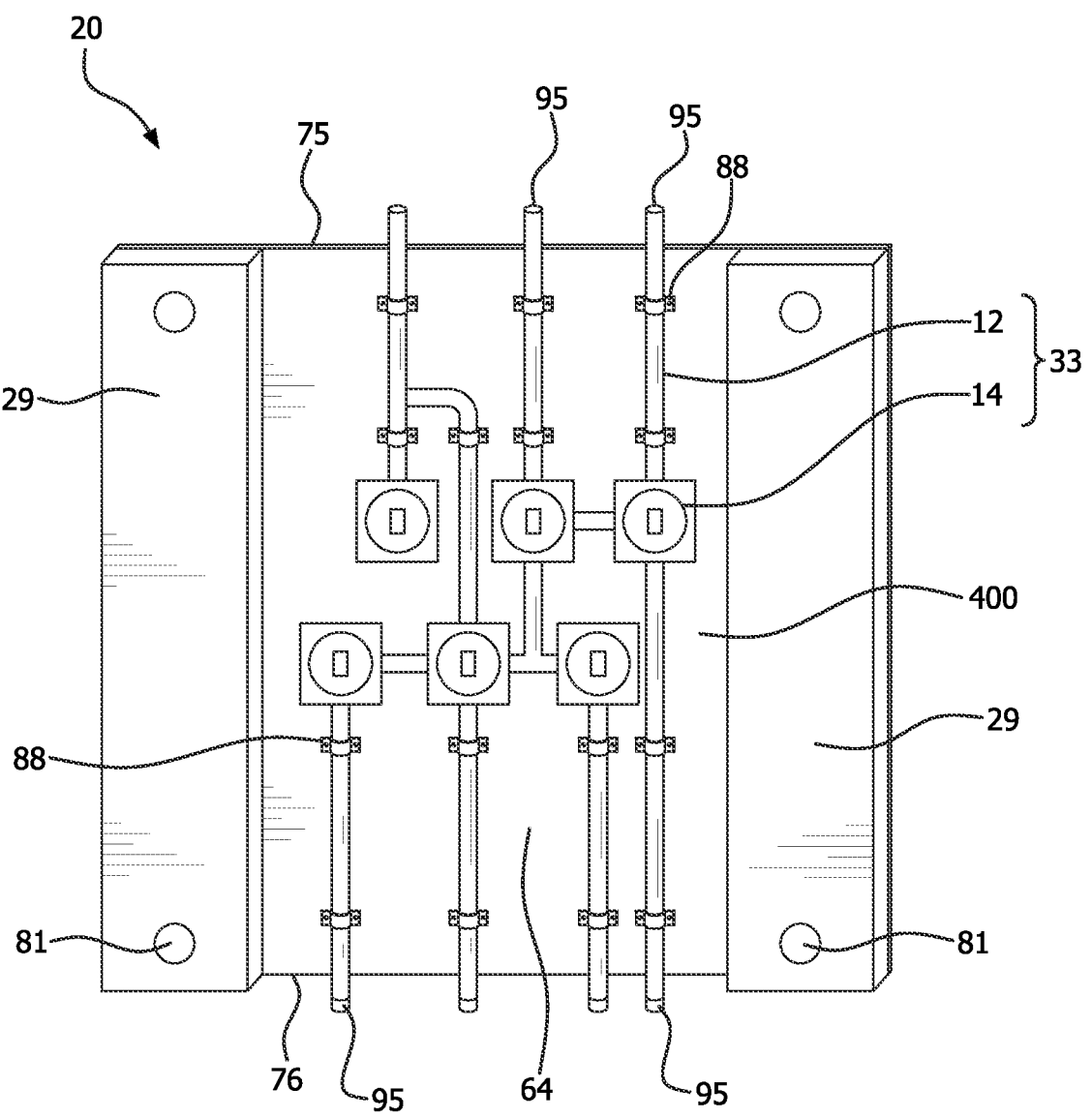
FIG. 4 is a front view of a heated valve manifold assembly used in a system of this invention with a layer of thermal insulation removed.

FIG. 4 shows a portion of one embodiment of the heated valve manifold assembly 20 with the top layer of insulation board removed to show the valve manifold 33 comprising the plurality valves 14 and pipes 12 and a portion of the heat-conductive plate 400 below the top layer of the insulation board. The valve manifold 33 may also comprise electrical components and wires thereto, such as, to controls and/or sensors (not shown in FIG. 4). As shown, in FIG. 4 the heated valve manifold assembly 20 comprises a heat-conductive plate 400, with the pipes and valves in contact with and/or may be physically attached to or mounted to the heat-conductive plate 400 by any number of attachment mechanisms 88. These mechanisms may include standoffs or Z-brackets secured to either the pipes or the valves, screws attached directly to the body of valves through the conductive plate, and/or fasteners that secure the valve manifold assembly to the backplate of a VMP or VMB or to a housing (e.g., the backwall) of a gas or chemical delivery system via tie-down or anchoring locations, described in FIG. 5. In FIG. 4, the attachment mechanism is a plurality of brackets 88 preferably constructed of a material with favorable thermal-conduction properties such as metal, e.g. aluminum that may be bolted or screwed into the plate 400 or otherwise attached to the plate 400. In the embodiment shown in FIG. 4 are two (vertical) strips 29 of insulation board, or the like, covering the vertical edges on the heat-conductive plate 400. When the top layer of insulation board (not shown) is attached over the insulation strips 29, (with holes in the top layer of the insulation board to allow for pipe attachments to the valves) an heated volume 64 will be created for the pipes and valves under the top layer of insulation board. Additional insulation may be added to cover the pipes and valves especially at or near the top edge 75 and/or at or near the bottom edge 76 of the heat-conductive plate 400 if desired prior to adding the top layer of insulation. Alternatively, additional layers of insulation, such as, a thermal jacket (not shown in FIG. 4) may be added. Shown in FIG. 4 are bolt holes 81 that will receive bolts that hold the layers of insulation on the heat-conductive plate 400.

For the embodiment, shown in a chemical delivery cabinet, the heat-conductive plate may be one of the walls of the housing 65, such as the back wall, but preferably is a separate one or more heat-conductive plates that are installed into the cabinet. A wall or panel may also be used as the heated plate for valve manifold boxes, valve manifold panels; however, it is preferred that a separate one or more heat-conductive plates are used in those systems having heated valve manifold assemblies of this invention too. The heat-conductive plate may be a metal plate. The presently preferred metals are aluminum and copper and alloys thereof, but any metal that can conduct heat can be used. The heat-conductive plate may be any shape. The heat-conductive plate is preferably rigid, meaning it maintains its shape when employed in the valve manifold assembly of this invention. The heat-conductive plate is preferably sized so that at least a portion of, or at least a portion of a majority of, or at least a portion of greater than 80% of, or at least a portion of greater than 90% of, or ideally at least a portion of 99% of the pipes and valves that are part of the valve manifold assembly 20 and need to be heated are heated by and/or are in contact with the heat-conductive plate or plates.

(The pipes that are part of the manifold do not include the pipes and valves that are outside of the gas or chemical delivery cabinet system or VMB or VMP that distribute process gases or chemicals to tools.) The heat-conductive plate(s) in contact with the pipes and valves of the manifold is(are) typically generally rectangular in shape, but may have any shape, and preferably sized to have enough surface area for a portion of the manifold and the one or more heaters to effectively heat the manifold and the fluid in the pipes and valves of the manifold. In systems in which there is a cabinet or box or housing into which the heated valve manifold assembly must be fit, the heat-conductive plate and the heated valve manifold assembly are sized to contact enough pipes and valves of the manifold to preferably result in at least a 35%, or at least a 50%, or at least a 60% decrease in the area of the pipes and valves that need to be heated by heat trace and insulated with insulated tape within the system. The heat-conductive plate may be physically strong enough (having a thickness or other dimensions) to support the weight of the valves and pipes of the valve manifold 33 and the weight of the one or more heaters and therefore, the valves and the pipes and the heater(s) may be attached to and/or mounted on the one or more heat-conductive plates. The valve manifold and the heater may contact and/or be attached to opposite sides of the heat-conductive plate, or the valve manifold and the one or more heaters may contact and/or be attached to the same side of the heat-conductive plate. Alternatively, the heat-conductive plate may be physically strong enough to support only the weight of the heater and therefore will be in physical contact with the valve manifold (comprising the pipes and valves) and will have the heater attached thereto. The valve manifold may be contacting a first side of the heat-conductive plate and the heater may be contacting and/or attached on the opposite side, the second side of the heat-conductive plate. In another embodiment, the heat-conductive plate may not be physically strong enough to support the weight of the valves and pipes of the valve manifold 33 or the one or more heaters. In that embodiment, the conductive plate may be in pressurized contact with the one or more heaters on a first side and the valve manifold may be on the same (first) or opposite (second) side (not shown) of the heat-conductive plate and all supported by the manifold. Preferably the heat-conductive plate is physically strong enough to support the weight of the manifold and the one or more heaters attached thereto.

Figure 5:
FIG. 5 is a partially exploded view of parts of the heated valve manifold assembly used in the systems of this invention.

In the heated valve manifold assembly 20 shown in FIGS. 4 and 5, the heater 410 is on the opposite side of the heat-conductive plate 400 as the valve manifold 33; however, in alternative embodiments, not shown the one or more heaters may be on the same side as the valve manifold. In yet other embodiments that are not shown, the heater may be in contact with the bottom edge 76 of the heat-conductive plate 400, or wrapped around the bottom edge 76 of the heat-conductive plate, and/or in yet other embodiments, contacting any portion of the heat-conductive plate 400. In embodiments, in which the valve manifold 33 and the heater 410 are on opposite sides of the heat-conductive plate 400 and the heated valve manifold assembly is present in a chemical or gas delivery or other cabinet, such as used in a VMB, access panels may be provided on opposite sides of the cabinet or the cabinet may comprise removable walls to access both sides of the heat-conductive plate.

FIG. 5 shows a partially exploded front view of one embodiment of the parts of the heated valve manifold assembly of this invention. FIG. 5 shows an insulation layer 22, such as an insulation board. The insulation layer is sized to cover the first side 41 of the heat-conductive plate 400. The heat-conductive plate 400 is shown with the valve manifold 33 attached to the first side 41 of the heat-conductive plate 400. Attached to or in contact with the second side (not shown) of the heat-conductive plate 400 is one or more heaters 410. The heater may be a resistive wire that may be attached directly to the second side (opposite the first side) of the heat-conductive plate via adhesive tape or it may be a heated mat or pad attached via adhesive or screws or bolts directly to the second side of the heat-conductive plate. Resistive wires and heating mats or pads are commercially available from many sources. Alternatively, the one or more heaters may utilize other means of heating including induction (the heat-conductive plate can act as a susceptor), radiative, convective, or heat exchanger pipes with heated fluid therein that contact the heat-conductive plate, preferably on one of the sides of the heat-conductive plate. The heater preferably is sized to cover most of the surface area of one of the sides, for example, the second side (not shown) of the heat-conductive plate. Additionally, as shown in FIG. 5, the heated valve manifold assembly 20 further comprises insulation layer 420 covering and/or contacting the side of the one or more heaters, away from the side of the heater contacting the second side of the heat-conductive plate. The insulation 420 is preferably sized to at least match the size of the surface area of the second side (not shown) of the heat-conductive plate 400. The insulation layer 420 may be constructed of any number of insulation materials, preferably the one or more insulation materials have a controllable shape such as foam sheets (flexible or rigid), silicone rubber, fiberglass, ceramic wool, or "blow-in" foam. The insulation 420 may be adhered to the heater 410 and/or the heat-conductive plate 400 by using adhesive or screws or bolts or any other fastener or fasteners described above. The insulation 420 may be formed or installed so that it wraps around one or more or all of the edges 75, 76, 77 and 79 of the heat-conductive plate 400 when the insulation covering the one or more heaters contacting and/or attached to the heat-conductive plate 400 are assembled. The insulation 420 if it wraps around the edges and onto a portion of the opposite surface of the heat-conductive plate can be used to define and form a heated volume as was described with reference to the embodiment shown in FIG. 4.

FIG. 5 shows optional bolt holes 81 and optional bolt holes 82. As shown, bolt holes 81 are used to attach at least some of the layers of insulation 22 to the heat-conductive plate 400 of the heated valve manifold assembly. Bolt holes 82 may be used to attach the heated valve manifold assembly to the back wall of the chemical or gas delivery cabinet or box, panel or wall for a valve manifold box or panel or any other system comprising the heated valve manifold assembly described herein. As shown in FIG. 5, optional spacers 89 (such as, a plastic, wood, ceramic or rubber washer), may be used to keep the heated valve manifold away from the walls or plates or any other potentially conductive surface if attached to one, such as in a cabinet or panel or box. Alternatively, any attachment mechanisms and fasteners may be used to attach and/or hold the individual components and layers of the heated valve manifold assembly in contact and/or together as a unit and/or in place in a system comprising the same.

FIG. 5 also shows that the heated valve manifold assembly 20 may comprise one or more temperature sensors 78 that communicate with a controller (not shown) to regulate the output of heat from the one or more heaters that are part of the heated valve manifold assembly. If the temperature sensor detects a low temperature, the heater will increase its heat output, and if the temperature sensor detects a high temperature the heater will decrease its heat output. The temperature sensor will also signal a heater malfunction to a controller (not shown). (The controller is also preferably used to turn the heater on and off based on demand for the fluid from the system. Electrical lines to and from the heater and sensors are not shown.) In some embodiments, one or more back up heaters can be provided in the heated valve manifold assembly when manufactured, so that if one heater fails, the second heater can be turned on, thereby extending the life of the heated valve manifold assembly and thereby avoiding a shut down of the heated valve manifold assembly for heater replacement.

Additionally, in some embodiments, if a repair is needed to any component of the heated valve manifold assembly, the entire heated valve manifold assembly of this invention may be disconnected and removed and replaced with a new heated valve manifold assembly that has been manufactured off-site to minimize the downtime of the heated valve manifold assembly, that may be in use in a system such as a valve manifold box, a valve panel, a gas delivery cabinet, or a chemical delivery cabinet that supplies one or more tools. To assist with the fast removal of the heated valve manifold assembly, quick release piping attachments 95 (shown in FIGS. 4 and 6) may be provided on the pipes 12 that are part of the valve manifold 33 around the edges of the heat-conductive plate 400. Additionally, any electrical wiring attached to the heat-conductive plate may also be provided with easy to disconnect and reconnect electrical connectors 96 (shown in FIG. 6).

Figure 6:
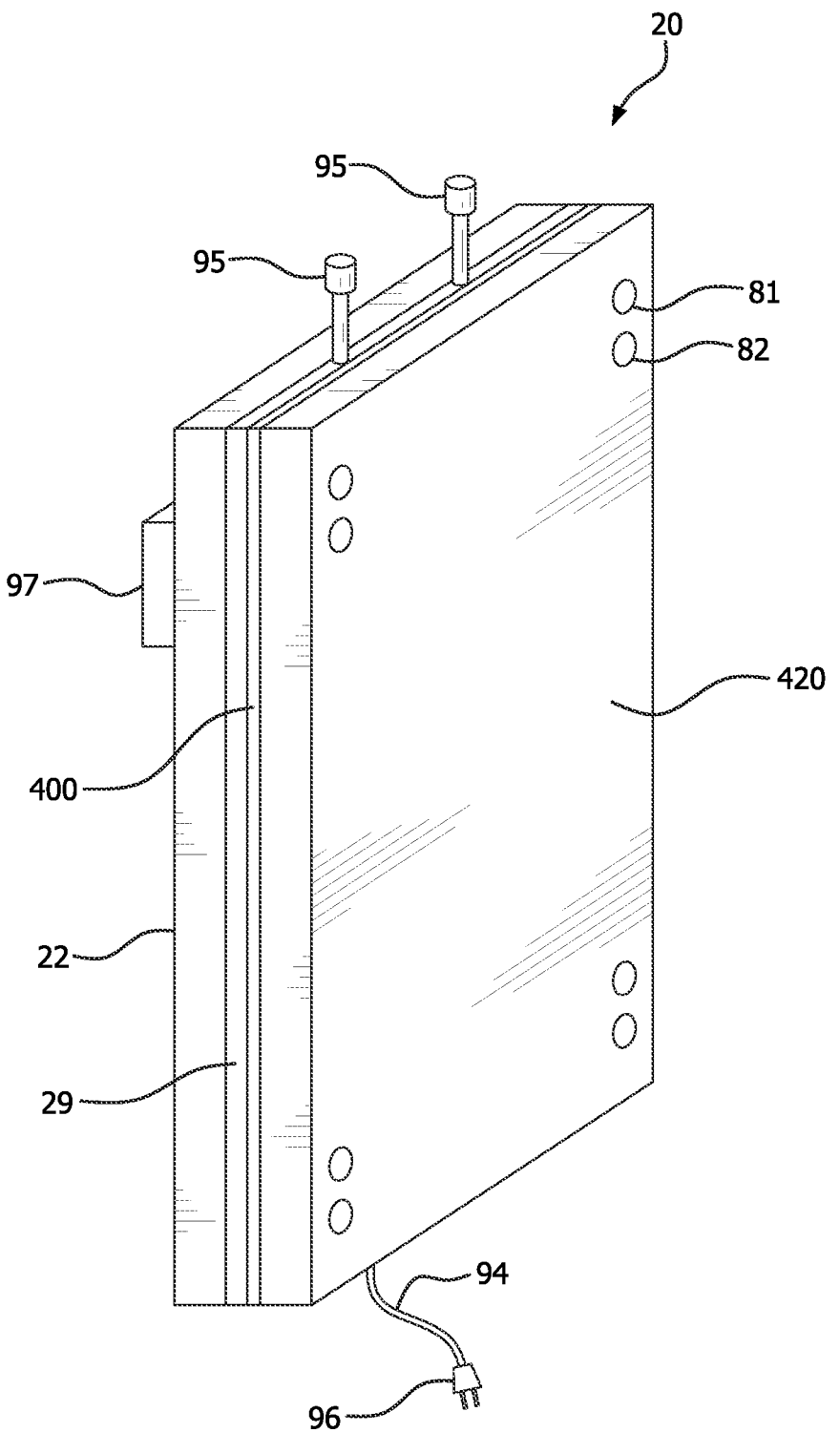
FIG. 6 is a back perspective view of one embodiment of the heated valve manifold assembly used in the systems of this invention.

FIG. 6 shows a back perspective view of another embodiment of the valve manifold assembly 20 of the invention similar to the one shown in FIG. 5. The same numbers were used to label parts already described in earlier figures. FIG. 6 additionally shows electrical wire 94 with the easy to disconnect and reconnect electrical connectors 96. As shown in FIG. 6, in some embodiments, the edges 75, 76, 77 and 79 of the heating plate may not be covered by one or more insulation layers, although in other embodiments, insulation is added to cover the entire surface area of the heat-conductive plate (and/or the valve manifold thereon), including the edges of the heat-conductive plate 400.

Figure 7:
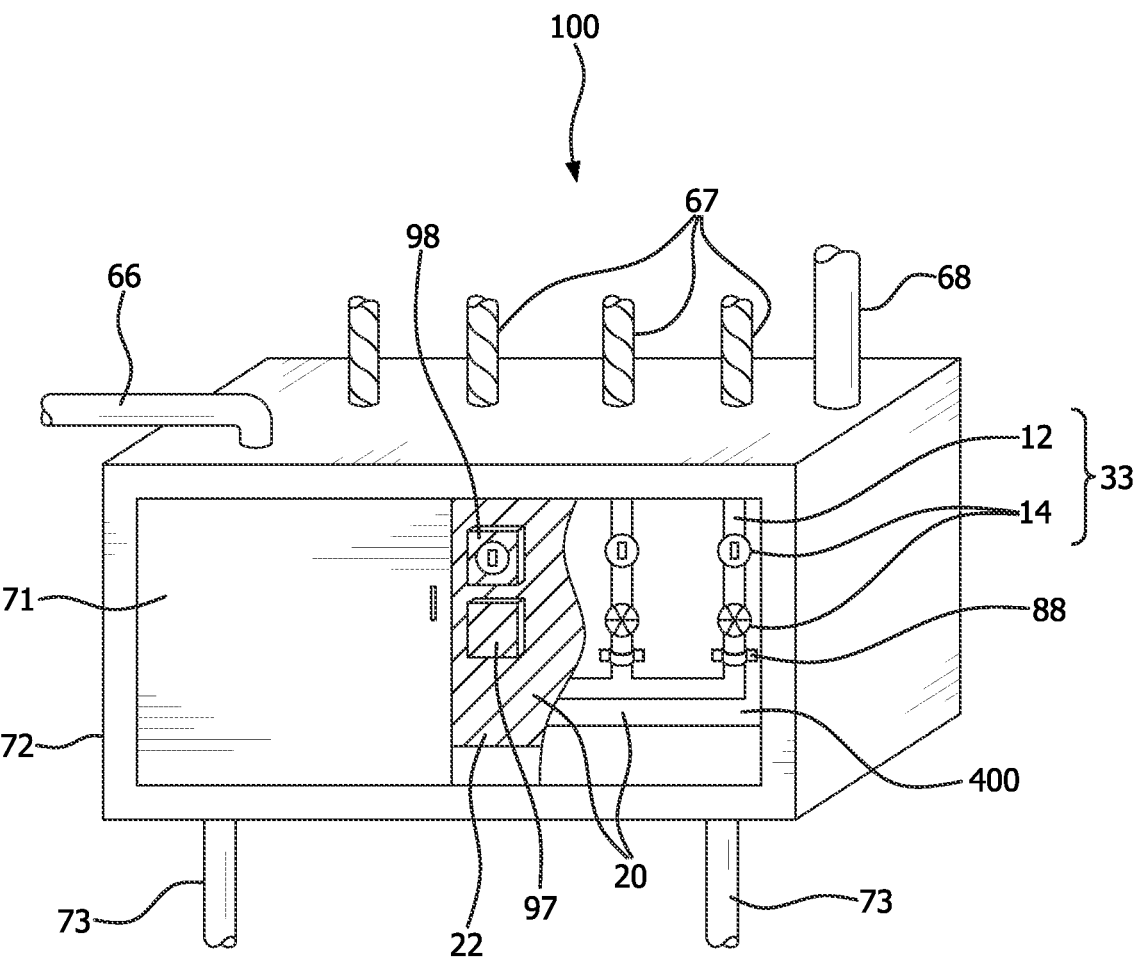
FIG. 7 is a perspective cutaway view of another embodiment of a system of this invention having a heated valve manifold assembly of this invention therein.

FIG. 7 shows another embodiment system 100 of the invention comprising a valve manifold assembly 20 of the invention. The system 100 shown is a valve manifold box (VMB). The valve manifold box comprises cabinet 72 having two doors, but is shown with one door 71 present and a second door removed thereby showing the valve manifold assembly behind the door comprising insulation 22, insulation pieces 97 and 98 covering valves, and further shown in cutaway behind insulation 22, the heat-conductive plate 400 and the manifold 33 comprising pipes 12 and valves 14. Not shown are the one or more heaters and additional one or more layers of insulation that are preferably present on the opposite side of the heat conductive plate 400. The system, as shown, further comprises one or more drain pipes 73 (one drain pipe preferably for the valve manifold assembly 33 and one drain pipe preferably for any leaks from the manifold into and contained by the cabinet 72), process material supply pipe 66 that provides the valve manifold 33 with the process material (fluid, liquid, gas), and more than one process material supply pipes 67 shown having heat tape thereon that exit the heated valve manifold assembly 20 and supply processes or tools with the process material from the VMB. The system 100, as shown, further comprises a vent 68. The system preferably additionally comprises a controller (not shown) and electrical attachments that control the heater and/or the valves in the valve manifold.

One of the benefits of this invention is the reduced manufacturing time and the reduced repair time for the systems having heated pipes and valves therein. In conventional manifolds, if it is necessary to heat the pipes and valves of the valve manifold, the pipes and valves are carefully wrapped with a resistive wire (heat trace) and then carefully wrapped with a second layer of adhesive insulation. If a repair is necessary, the insulation and the heat trace would have to be removed from the effected valve or pipe and then the heat trace and the insulation would have to be reattached to the repaired pipe and/or valve. Additionally, if a faulty or broken heat trace was the issue, the heat trace and insulation may have to be removed from the entire valve manifold and replaced with new heat trace and wrapped insulation. The installation and removal and reinstallation of heat trace and insulation in the conventional systems were time consuming tasks.

By using the system of this invention, the manufacturing and repair times can be greatly reduced. The method of manufacturing the system having a heated valve manifold assembly includes the steps of contacting and/or attaching the pipes and valves of the manifold to the heat-conductive plate, contacting and/or attaching one or more heaters to the surface of one or more sides of the heat-conductive plate; covering and/or contacting and/or attaching one or more layers of insulation over the one or more heaters, and a majority of the surface area of the pipes and valves heated by or contacting the heat-conductive plate and/or the majority of the surface area of the heat-conductive plate. More preferably the covering and/or contacting and/or attaching one or more layers of insulation will be over greater than 75%, or greater than 90%, or greater than 99% of the surface area of one or more heat-conductive plates and a majority, or greater than 75%, or greater than 90%, or greater than 99% of the surface area of all of the pipes and valves in contact with the heat-conductive plate, and a majority, or greater than 75%, or greater than 90%, or greater than 99% of the exterior surface area of one or more heaters that are contacting or attached to the one or more heat-conductive plates. The method of manufacturing may additionally include the step of attaching, and/or screwing and/or soldering and/or otherwise joining the pipes and valves of the valve manifold to create the valve manifold. Some or all of the components of the manifold may be connected to each other first to create the valve manifold and then the valve manifold may be attached or contacted to the heat-conductive plate. Alternatively, the components of the valve manifold may be attached to the heat-conductive plate and connected to each other in separate steps to construct the manifold on the heat-conductive plate in multiple steps, or in another embodiment, portions of the valves and piping may be connected to each other in separate steps and then attached to the heat-conductive plate in separate steps eventually resulting in the valve manifold attached to the heat-conductive plate. In another embodiment, the heat-conductive plate may be mounted into a system first and the valve manifold may be manufactured separately and attached to the heat-conductive plate in a single step or a portion of the components of the valve manifold may be attached to each other and attached to the heat-conductive plate in a series of steps, eventually resulting in the valve manifold attached to the heat-conductive plate or the components of the manifold may be attached to each other and the heat-conductive plate at the same time. The steps of manufacture additionally comprise one or more steps of adding the insulation thereto which may be done in any order. For example, one or more insulation layers may be attached to the one or more heaters after the one or more heaters are attached to the heat-conductive plate and the one or more insulation layers covering the valve manifold may be attached or contacted to the heat-conducting plate subsequent to the attachment of the valve manifold to the heat-conducting plate.

In one embodiment, the method of repairing a system comprising the heated valve manifold assembly of this invention includes the steps of removing one or more insulation layers by removing one or more fasteners, which may be mechanical fasteners, such as screws, nuts, bolts, and washers, zippers, hook and loop strips, to access the plurality of pipes and valves heated by and contacting, and/or attached to a heat-conducting plate, repairing or replacing the faulty valve or pipe heated by and contacting and/or attached to the heat-conducting plate; and re-attaching said one or more insulation layers using said one or more fasteners.

Also contemplated by this invention is the method of manufacturing a system or repairing a system having a heated valve manifold assembly therein, by manufacturing the heated valve manifold assembly separately and then connecting the heated valve manifold assembly into a box, cabinet or onto a panel having piping prepared to receive the pipes that are part of the heated valve manifold assembly by connecting the pipes on the heated valve manifold assembly to the receiving pipes otherwise present in the system via mating connectors provided on the pipes on the heated valve manifold assembly and the receiving pipes in the system. Reusable and quick-mating connectors such as VCR couplings manufactured by the Swagelok Company may be utilized to provide a repeatable means of joining together two sections of fluid piping in ultra-high purity applications such as those commonly found in the semiconductor industry. When a repair is necessary, a faulty heated valve manifold assembly in the system just described can be removed by disconnecting the quick mating connectors, removing the entire heated valve manifold assembly and reconnecting a new or refurbished heated valve manifold assembly with the same mating connectors and preferably the same layout of the pipes and valves already present on the replacement heated valve manifold assembly. Quick-release (mating) electrical connectors that work similarly to the quick mating piping connectors may also be provided as part of the heated valve manifold assembly if electrical components are present as part of the heated valve manifold assembly.

While the present invention has been described with reference to preferred embodiments, as will occur to those skilled in the art, numerous changes, additions and omissions may be made without departing from the spirit and scope of the present invention. Any use of comprising includes the more narrow consisting essentially of and consisting of.

The invention claimed is:

1. A system to dispense fluid to one or more tools for semiconductor fabrication comprising:
   a heated valve manifold assembly comprising:
      a heat-conductive plate having a total surface area, a first side, and a second side opposite the first side;
      a heater contacting the second side of the heat-conductive plate;
      a valve manifold comprising a plurality of valves and pipes contacting the first side of the heat-conductive plate;

a first layer of insulation in contact with the first side of the heat-conductive plate;
a second layer of insulation in contact with the second side of the heat-conductive plate and the heater; and
wherein the first layer of insulation is shaped to provide a heated air volume where most of the plurality of pipes and valves are mounted on the heat-conductive plate.

2. The system of claim 1 wherein the first layer of insulation and the second layer of insulation comprise insulation board.

3. The system of claim 1 wherein the first layer of insulation and the second layer of insulation comprise insulation attached to a plastic cover.

4. The system of claim 1 wherein the first layer of insulation and the second layer of insulation comprise an insulated jacket made of flexible insulating material.

5. The system of claim 1 wherein the first layer of insulation and the second layer of insulation are removably attached to the heat-conductive plate using fasteners selected from bolts, screws, clamps, zippers, hook and loop, cable ties, magnets, adhesives, snaps, clasps, bungee cords, and hook and eye.

6. The system of claim 1 wherein the plurality of valves and pipes contacting the first side of the heat-conductive plate are removably attached to the first side of the heat-conductive plate.

7. The system of claim 6 wherein the pipes of the plurality of valves and pipes contacting, and removably attached to, the first side of the heat-conductive plate comprise quick release connectors that can be disconnected and reconnected for the rapid removal and replacement of the heated valve manifold assembly.

8. The system of claim 1 wherein the heater is removably attached to the second side of the heat-conductive plate.

9. The system of claim 1 further comprising a cabinet and a container of the fluid, wherein the cabinet houses the heated valve manifold assembly and the container.

10. The system of claim 1, wherein said heated valve manifold assembly is mounted on a wall or panel using spacers to prevent contact between the heated valve manifold assembly and the wall or panel.

11. The system of claim 1, further comprising a second heater contacting the second side of the heat-conductive plate.

12. The system of claim 1, further comprising a temperature sensor contacting the first side of the heat-conductive plate configured to measure the temperature of the first side of the heat-conductive plate and emit a temperature signal.

13. The system of claim 12, further comprising a controller in electrical communication with the temperature sensor, and the heater, that is configured to receive the temperature signal from the temperature sensor and emit a heater change signal to the heater while the temperature signal is other than a predetermined value.

14. The system of claim 1 wherein said system is a gas or chemical delivery cabinet.

15. The system of claim 1 wherein said system is a valve manifold box.

16. The system of claim 1 wherein said system is a valve manifold panel.

17. The system of claim 1 wherein said first layer of insulation is removably attached to said conductive plate using fasteners that are free of adhesives.

18. A method of manufacturing the system of claim 1 comprising the steps of:

contacting the valve manifold comprising the plurality of valves and pipes to the first side of the heat-conductive plate;

contacting the heater to the second side of the heat-conductive plate;

contacting the first side of side of the heat-conductive plate with the first layer of insulation, wherein the first layer of insulation is shaped to provide a heated air volume where most of the plurality of pipes and valves are mounted on the heat-conductive plate; and contacting the second side of the heat-conductive plate with the second layer of insulation.

19. The method of manufacturing of claim 18, further comprising the step of joining the pipes and valves of the valve manifold to create fluid tight seals within the valve manifold.

20. The method of manufacturing of claim 18 wherein the method of attaching the first layer of insulation comprises mechanical fasteners.

21. The method of manufacturing of claim 18 wherein the method of contacting the first layer of insulation is free of adhesives.

\* \* \* \* \*